UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE COMPOSITION.

1,342,603.  Specification of Letters Patent.  Patented June 8, 1920.

No Drawing.  Application filed April 26, 1919. Serial No. 293,008.

*To all whom it may concern:*

Be it known that I, PAUL C. SEEL, a citizen of the United States of America, residing at Rochester, in the county of Monroe and State of New York, have invented certain new and useful Improvements in Cellulose-Acetate Compositions, of which the following is a full, clear, and exact specification.

This invention relates to a new composition of matter and a method of making the same, in which cellulose acetate is combined or mixed with other substances, so that the resulting product can be advantageously used in the plastic and analogous arts, such, for instance, as sheet or film manufacture and varnish manufacture.

One object is to produce a composition which may be made into permanently transparent, strong and flexible sheets or film of desired thinness that are substantially waterproof, are unaffected by ordinary photographic fluids and possess the desired properties of a support for sensitive photographic coatings. Another object of my invention is to produce a composition of matter capable of easy manipulation in the plastic and film making or varnish making arts; which will not injure or be injured by the substances with which it is associated during manufacture, storage, or use. Another object of my invention is to provide a process for compounding such a composition of matter. Further objects will hereinafter appear.

I have discovered that a composition of matter having the desirable qualities hereinabove enumerated can be obtained from mixing or compounding cellulose acetate with acetone and ethyl propionate. Ethyl propionate is a colorless liquid at ordinary temperatures and its boiling point is about 99.1° C. It is not when used alone a solvent for cellulose acetate, but I have discovered that it is a latent solvent for cellulose acetate, inasmuch as when it is added to other substances in which cellulose acetate is readily soluble that much less of such substances need be used than normally.

In carrying out one illustration of my invention, I incorporate in 360 parts of acetone the following ingredients: 100 parts of cellulose acetate, 135 parts of ethyl propionate, and 20 parts of fusel oil. The proportions of these ingredients may vary within certain limits, as the acetone may be present in from 300 to 500 parts. The ethyl propionate may be present in from 1 to 200 parts, and the fusel oil in from 20 to 25 parts. It is understood that higher aliphatic alcohols or their esters may be substituted for fusel oil, or the high boiling softener may be omitted entirely.

The solution either with or without the additional high boiling softener, is sufficiently thick and viscous to be properly flowed during sheet or film manufacture, the acetone volatilizing but not too rapidly to impair the product. The resulting film containing cellulose acetate and propionate, together with the additional high boiling softener if the latter is used, is very flexible, transparent, and uniform so that it can be used for any usual or preferred purpose. It is practically waterproof and unaffected by ordinary photographic chemicals.

While I have hereinabove disclosed certain compositions and processes by way of example, my invention is not limited thereto nor to the proportions given therein, my experiments indicating that the proportions may be varied from those given and equivalent substances may be substituted without departing from the principle of my invention as defined in the appended claims.

Having thus described my invention, what I claim as new and desire to secure by Letters Patent is:

1. A composition of matter comprising cellulose acetate and ethyl propionate.

2. A composition of matter comprising cellulose acetate, ethyl propionate and a solvent common to both.

3. A composition of matter comprising acetone 300 to 500 parts, cellulose acetate 100 parts and ethyl propionate 1 to 200 parts.

4. A composition of matter comprising cellulose acetate, ethyl propionate, acetone and a high boiling auxiliary softener.

5. As an article of manufacture, a sheet of deposited or flowed cellulose acetate containing ethyl propionate.

6. As an article of manufacture, a sheet of deposited or flowed cellulose acetate containing ethyl propionate and a high boiling auxiliary softener.

7. The process of making a composition of matter which consists in combining cellulose acetate and ethyl propionate in a solvent common to both.

8. The process of making a composition of matter which consists in combining cellulose acetate and ethyl propionate by the use of acetone.

9. The process of making a composition of matter which consists in combining cellulose acetate and ethyl propionate by the use of acetone and in the presence of a high boiling auxiliary softener.

Signed at Rochester, New York, this 16th day of April, 1919.

PAUL C. SEEL.